US008769015B2

(12) United States Patent
Nguyen

(10) Patent No.: US 8,769,015 B2
(45) Date of Patent: Jul. 1, 2014

(54) CONTENT DISTRIBUTION METHODS FOR A RING NETWORK AND RELATED SYSTEMS AND COMPUTER PROGRAM PRODUCTS

(75) Inventor: Anh Nguyen, Fullerton, CA (US)

(73) Assignee: Thales Avionics, Inc., Irvine, CA (US)

( * ) Notice: Subject to any disclaimer, the term of this patent is extended or adjusted under 35 U.S.C. 154(b) by 178 days.

(21) Appl. No.: 13/561,510

(22) Filed: Jul. 30, 2012

(65) Prior Publication Data
US 2014/0032660 A1    Jan. 30, 2014

(51) Int. Cl.
*G06F 15/16* (2006.01)
*G06F 21/10* (2013.01)
*H04N 21/4405* (2011.01)

(52) U.S. Cl.
USPC ........... 709/204; 709/238; 709/239; 709/251; 709/201; 710/52; 370/222; 370/223; 370/224; 370/216; 370/221

(58) Field of Classification Search
CPC ...... G06F 15/16; G06F 21/10; H04N 21/4405
USPC .......................... 709/204, 238, 239, 251, 201
See application file for complete search history.

(56) References Cited

U.S. PATENT DOCUMENTS

| | | | | |
|---|---|---|---|---|
| 6,138,187 | A * | 10/2000 | Denning et al. | 710/52 |
| 6,751,297 | B2 * | 6/2004 | Nelkenbaum | 379/88.13 |
| 2007/0083473 | A1 * | 4/2007 | Farrugia et al. | 705/57 |
| 2007/0220175 | A1 * | 9/2007 | Khanna et al. | 709/251 |
| 2012/0167148 | A1 | 6/2012 | Healy et al. | |
| 2012/0317655 | A1 * | 12/2012 | Zhang et al. | 726/28 |

FOREIGN PATENT DOCUMENTS

WO    WO 2008/029040 A2    3/2008

OTHER PUBLICATIONS

Loureiro et al., "Searching content on peer-to peer networks for in-flight entertainment," Aerospace Conference, IEEE, Mar. 5, 2011, pp. 1-14.
Jongtack et al., "PECAN: Peer cache adaptation for peer-to-peer video-on-demand streaming," Journal of Communications and Networks, Korean Institute of Communication Sciences, Seoul, KR, vol. 14, No. 3, Jun. 1, 2012, pp. 286-290.
Hecht et al., "LiveShift: Mesh-pull live and time-shifted P2P video streaming," IEEE 36$^{th}$ Conference on Local Computer Networks (LCN), Oct. 4, 2011, pp. 315-323.
Notification of Transmittal of the International Search Report and the Written Opinion of the International Searching Authority, or the Declaration, PCT/US2013/052462, Nov. 4, 2013.

* cited by examiner

*Primary Examiner* — Jude Jean Gilles
(74) *Attorney, Agent, or Firm* — Myers Bigel Sibley & Sajovec

(57) ABSTRACT

Methods for distributing content in an entertainment system are provided. The entertainment system includes a plurality of clients connected in a bi-directional loop configuration. Each of the plurality of clients has at least one associated video display unit. The method includes deriving a content distribution plan for distributing content files to the plurality of clients based on a theoretical symmetric system where each of the plurality of clients in the symmetric system is configured to store at least a fraction of each of the content files; and applying the derived content distribution plan for distributing content files to an actual entertainment system wherein each of the content files are stored in full in at least one of the plurality of clients of the system to provide an actual content distribution plan for the actual entertainment system. Related entertainment systems and content distribution modules are also provided.

23 Claims, 11 Drawing Sheets

CONTENT DISTRIBUTION METHODS FOR A RING NETWORK AND RELATED SYSTEMS AND COMPUTER PROGRAM PRODUCTS

FIELD

The present disclosure relates to content distribution systems and, more particularly, to content distribution systems for peer-to-peer streaming in a ring network.

BACKGROUND

In-flight entertainment (IFE) systems are deployed onboard aircraft to provide entertainment for passengers in a passenger cabin. Video display units are used to deliver services, such as audio/video-on-demand (AVOD), web browsing, email, voice-over-internet protocol (IP), shopping, games, and the like for the IFE.

Typically, in-flight television programs are provided through personal video display units (VDUs) installed at each passenger seat or on overhead VDUs that can be spaced over groups of seats. Audio content is provided through personal headsets connected to audio jacks installed in the seats, usually in the armrest of the seats. When installed at each passenger seat, all seats can be networked to one or more centralized content servers to receive video/audio content. Ethernet is an example communications network that can be used for data packet communications between the content server(s), which is usually installed somewhere in an airplane hidden from the passengers view, and the VDUs.

In some conventional systems, for example, the system illustrated in FIG. 1, video display units (VDUs) 120 can be connected in a logical ring network connected to a head-end server 110. Each link in the network loop may be bidirectional, thus allowing at least two non-overlapping data paths between a network node (e.g., VDU) to any other node (e.g., VDU) for redundancy.

To provide media content, the VDUs 120 are fed a steady stream of media/data from either a local storage subsystem or from the head-end server 110. In some systems all content is stored at the head-end server 110, in others all content is stored locally at the seat-back client 120.

A typical IFE operator's requirement is that each VDU 120 (client) has access to a total data volume in the order of 1 terabyte (TB). If the data is stored at one or more (for redundancy) head-end servers 110, then the cost to develop, deploy, and operate a high-performance server is necessary, for example, to handle worst-case concurrent demand. On the other hand, if the entire data volume is stored locally at each client 120, then the cost, per client 120 would be prohibitive due to the large storage requirement and the number of clients needed.

Between these extremes, there is a continuum of implementation choices for state-of-the-art in conventional systems. For example, an operator may choose to store popular data locally at the VDU (client 120) and infrequently accessed data at the server (head-end 110), thus possibly reducing the server's high-performance requirement due to lowered effective demand. However, a hybrid implementation is often more costly than just a linear combination of the two extremes' due to the high non-recurring cost of new functional development for two devices.

Alternatively, the IFE operator may choose to accept a certain level of service outage (probabilistically) and undersize the server's performance capacity to reduce server cost. If a new passenger's request exceeds the server's instantaneous spare capacity, it may be rejected. This approach may incur a less tangible cost associated with lowered quality-of-experience for the passengers. Accordingly, improved methods and systems for content distribution may be desired.

SUMMARY

Some embodiments of the present inventive concept provide methods for distributing content in an entertainment system. The entertainment system includes a plurality of clients connected in a bi-directional loop configuration. Each of the plurality of clients has at least one associated video display unit. The method includes deriving a content distribution plan for distributing content files to the plurality of clients based on a theoretical symmetric system where each of the plurality of clients in the symmetric system is configured to store at least a fraction of each of the content files; and applying the derived content distribution plan for distributing content files to an actual entertainment system wherein each of the content files are stored in full in at least one of the plurality of clients of the system to provide an actual content distribution plan for the actual entertainment system.

In further embodiments, copies of a same content file may be stored at at least two of the plurality of clients, wherein the at least two plurality of clients are configured to playback the stored content file on the video display unit physically therewith and/or stream the stored content file to a video display unit physically with another of the plurality of clients.

In still further embodiments, the method may further include distributing the content files according to the actual content distribution plan for the actual entertainment system. In certain embodiments, distributing the content files according to the actual content distribution plan for the actual entertainment system may include attempting to minimize duplication of each of the content files by storing the same content file in as few of the plurality of clients as possible while satisfying a specified quality of service; and attempting to maximize use of an existing data path by retrieving content files from adjacent clients rather than retrieving the content files from a central server.

In some embodiments, distributing the content files according to the actual content distribution plan for the actual entertainment system may be followed by receiving real time feedback with respect to performance of the actual content distribution plan for the actual entertainment system adjusting the actual content distribution plan based on the received real time feedback to provide an adjusted content distribution plan; and distributing the content files based on the adjusted content distribution plan.

In further embodiments, each of the content files $F_i$ may have an associated content type and wherein each content type has an associated load, the associated load being a function of popularity of the content type ($P_i$), a file size of the content type ($S_i$) and the stream rate of the content type ($R_i$).

In still further embodiments, the entertainment system may be an in flight entertainment system.

In some embodiments, each of the plurality of clients may have an associated data path capacity (D), an associated datapath occupancy $R_{occ}(.)$ an associated storage capacity (S) and an associated storage occupancy $S_{occ}(.)$.

Further embodiments of the present inventive concept provide entertainment systems including a central server; a plurality of clients in communication with the central server, the plurality of clients being connected in a bi-directional loop configuration; and at least one video display unit physically with each of the plurality of clients, wherein at least two of the plurality of clients are configured to store a same content file and wherein the at least two plurality of clients are configured to playback the stored content file on the video display unit physically therewith and/or stream the stored content file to a video display unit physically with another of the plurality of clients connected in the bidirectional loop.

Other entertainment systems, methods and computer program products according to embodiments of the inventive concept will be or become apparent to one with skill in the art upon review of the following drawings and detailed description. It is intended that all such additional entertainment systems, electronic units, and methods be included within this description, be within the scope of the present inventive concept, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the inventive concept. In the drawings.

DETAILED DESCRIPTION

In the following detailed description, numerous specific details are set forth in order to provide a thorough understanding of the inventive concept. However, it will be understood by those skilled in the art that the present inventive concept may be practiced without these specific details. In other instances, well-known methods, procedures, components and circuits have not been described in detail so as not to obscure the present inventive concept.

Various embodiments of vehicle entertainment systems and related electronic units for vehicle entertainment systems are described herein which may provide benefit over prior vehicle entertainment systems, such as by improving fault tolerance and availability of systems. Although various embodiments of the present inventive concept are explained herein in the context an aircraft in-flight entertainment systems, embodiments of entertainment systems and related electronic units are not limited thereto and may be used in other environments, including other vehicles such as ships, buses, and trains, as well as buildings such as conference centers, restaurants, businesses, and hotels, and the like without departing from the scope of the present inventive concept.

Figure 1:
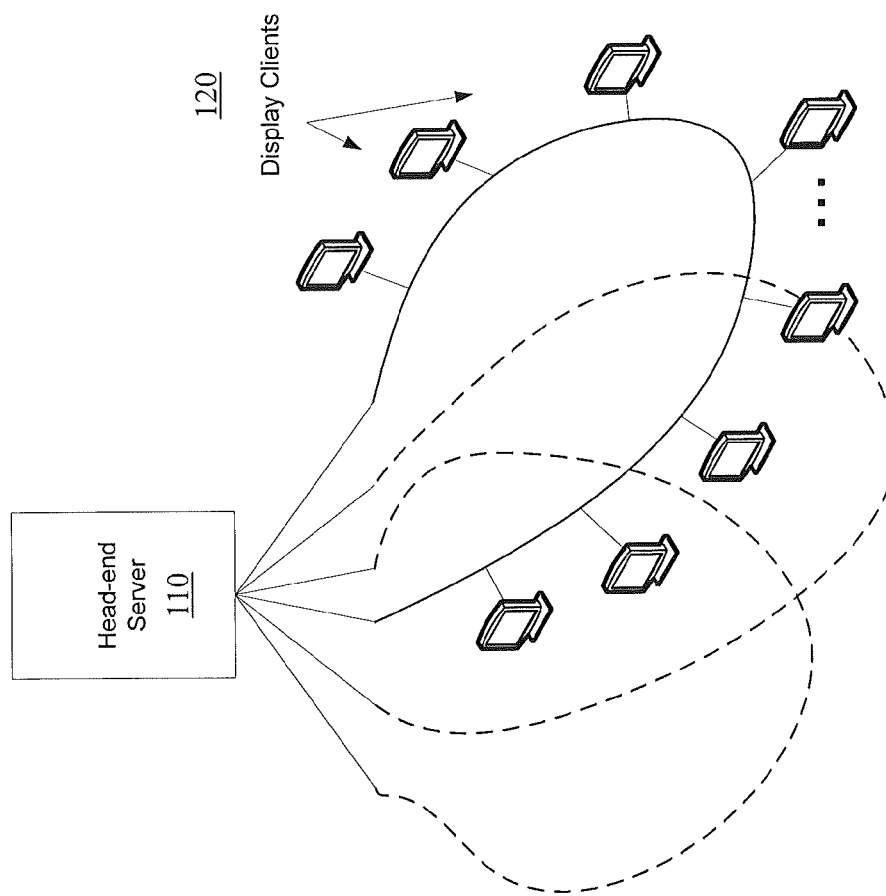
FIG. 1 is a block diagram illustrating a conventional ring topology for including a head end server and client.

As discussed above, conventional methods and systems for content distribution in a vehicle entertainment system, for example, an in flight entertainment (IFE) system, may not provide an adequate quality of service in a cost effective manner. As discussed above, in conventional systems, for example, the system illustrated in FIG. 1, content servers are typically provided in a logical network loop. Each link in the network loop is bidirectional, thus allowing at least two non-overlapping data paths between a network node to any other node for redundancy.

Figure 2:
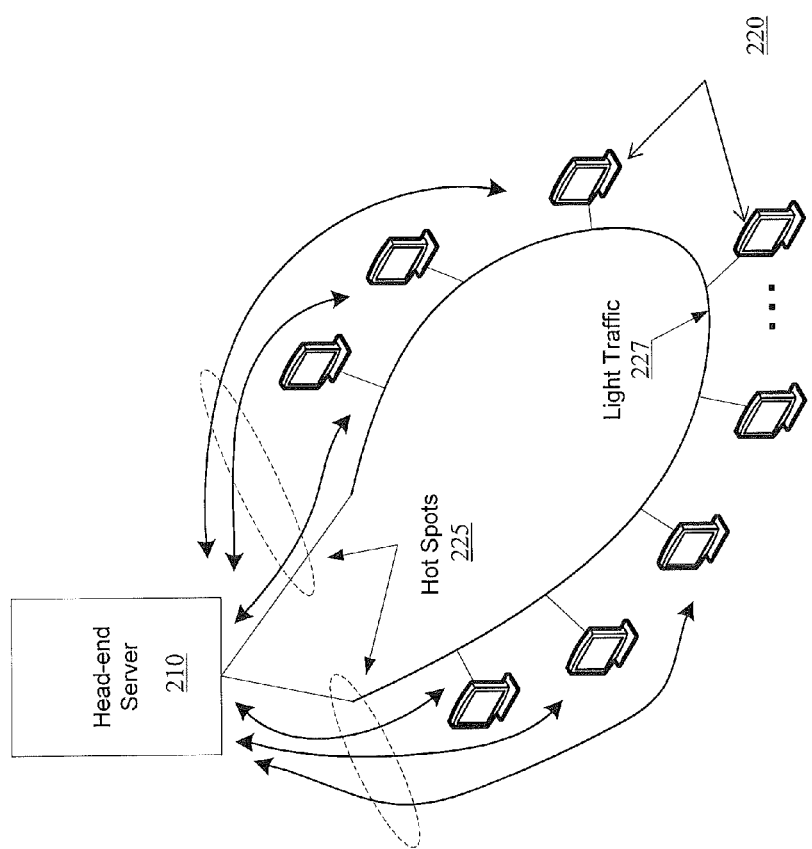
FIG. 2 is a block diagram illustrating a conventional ring topology and the associated hot spots.

However, there are disadvantages to conventional content distribution systems. For example, a centralized data server system may be more expensive. For example, a network with larger pipe would be constructed to accommodate traffic hot spots 225, i.e. high traffic areas surrounding the servers and nearby clients as illustrated in FIG. 2. These hot spots 225 occur due to the high volume of traffic to and from a head-end server 210, thus, a high-capacity server-network link is needed. Thus, possibly requiring the rest of the network links to be high-capacity links as well due to the appeals of network symmetry to ease traffic management, installation complexity, and component reusability. However, since the network traffic isn't symmetric, much of the link capacity is unused at nodes away from the servers, i.e. light traffic areas 227.

In systems with duplicative local storage, there is opportunity cost. In other words, the data path capacity in conventional seat-back clients is typically in the order of 1.0 Gigabits/second (Gbps), due to, for example, customer demand, parts availability, and other market forces. However, much of this capacity is often unused. For example, when a client is playing locally stored audio/video-on-demand (AVOD), it is consuming a maximum of about 10 Megabits/second (Mbps) of its data path capacity. Content, for example, MPEG4, H.264, and like decoding is often provided by a separate hardware block and has minimal impact on a device's data-path capacity. Similarly, the network links in local storage systems are under-utilized.

Accordingly, some embodiments of the present inventive concept address these problems of content distribution in peer-to-peer (P2P) streaming networks. In particular, some embodiments of the present inventive concept provide a content distribution scheme for ring P2P streaming networks. As will be discussed further herein with respect to FIGS. 3 to 11, some embodiments of the present inventive concept provide an algorithm that is configured to determine what content to store at each of the plurality of clients to maintain a specified quality of service. It will be understood that embodiments of the present inventive concept assume that media and data are stored atomically, i.e., no fractional file storage is allowed and, thus, a media (or data) file is either stored in its entirety on the client or not at all.

In particular, some embodiments of the present inventive concept provide a content distribution system that given a set of identical seat-back media players with limited local storage and streaming capacity, along with a large content set and associated usage profile, determines how the content be distributed to guarantee a specified quality-of-service (QoS). Conventional systems do not provide a systematic way to distribute the content economically and with predictable QoS. As discussed above, storing the content in its entirety locally will give predictable QoS, but is the cost of the infrastructure needed to implement this method is not economical. Distributing the content arbitrarily reduces local storage requirement, but cannot guarantee QoS. Accordingly, some embodiments of the present inventive concept provide methods and systems for distributing content based on selected quality of service as will be discussed further herein.

Figure 3:
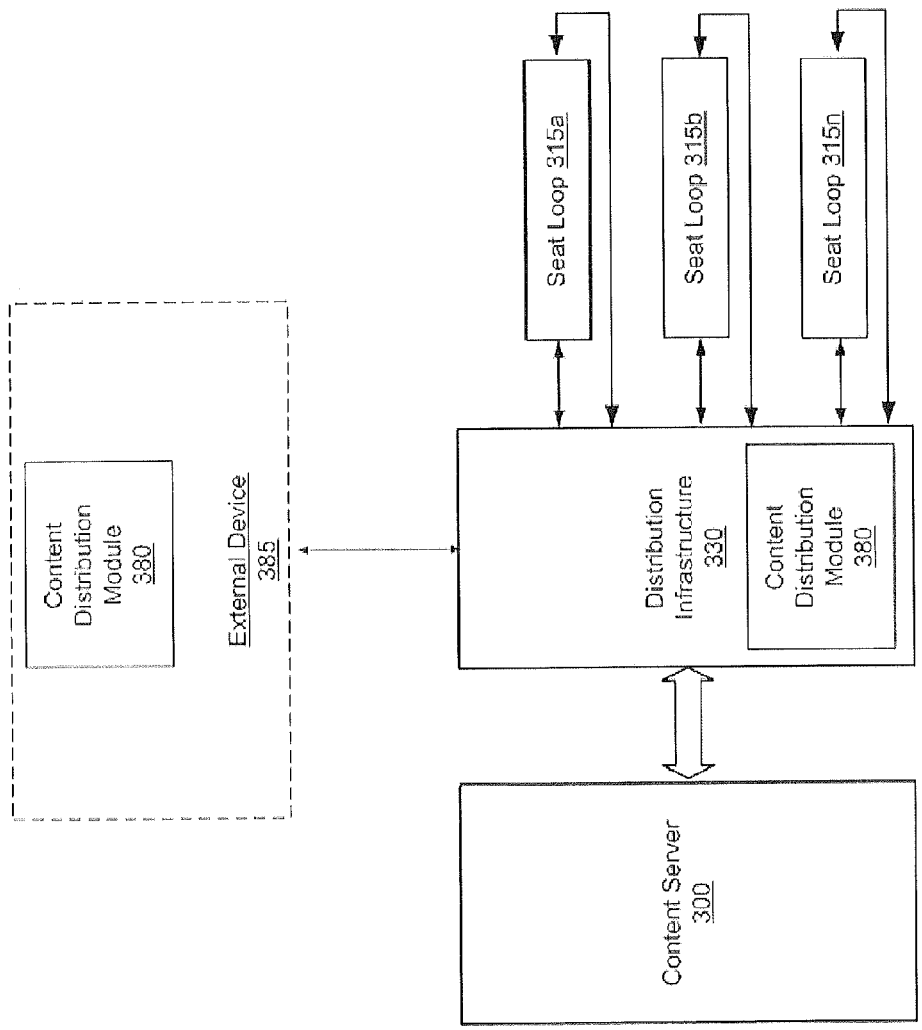
FIG. 3 is a block diagram of an aircraft in-flight entertainment system including a content distribution module in accordance with some embodiments of the inventive concept.

Referring first to FIG. 3, a block diagram of an aircraft in-flight entertainment system including a content distribution module in accordance with some embodiments of the present inventive concept will be discussed. The in-flight entertainment system includes a head end (content) server 300, distribution infrastructure 330, and a plurality of seat electronic units that are communicatively daisy chained to form a plurality of seat loops 315a, 315b . . . 315n. It will be understood that in some embodiments the plurality of seat electronic units could be a plurality of video display units or a combination of electronic units associated with video display units without departing from the scope of the present inventive concept.

The content server 300 can contain media content, such as movies, television programs, audio programs, and/or computer program applications that can be downloaded/streamed over the distribution infrastructure 330 to addressable video display units (seat electronic units) within the seat loops 315a, 315b . . . 315n. The content server 300 may include a plurality of data servers or other mass storage devices that can store media content, and which may be replicated for fault tolerance or other reasons. Although FIG. 1 only depicts three seat loops for ease of illustration, the seat electronic units can be networked into any number of seat loops, for example, only a single or two seat loops may be present or more than three seat loops may be present without departing from the scope of the present inventive concept.

The distribution infrastructure 330 is a subsystem that routes digital data packets containing content from the content server 300 to addressed seat electronic units within particular ones of the seat loops 315a, 315b . . . 315n. The distribution infrastructure 330 may includes switches, routers and network cables and/or other network components. The distribution infrastructure 330 may be configured to satisfy unique requirements for use in an aircraft IFE system. As further illustrated in FIG. 3, a content distribution module 380 in accordance with some embodiments of the present inventive concept may be included in the distribution infrastructure 330. However, embodiments of the present inventive concept are not limited to this configuration. For example, the content distribution module 380 may be included in an external device 385, for example, a computer or processor, which may be in communication with the IFE. Functionality of the content distribution module 380 in accordance with embodiments discussed herein will be discussed further below with respect to FIGS. 7-11.

Figure 4:
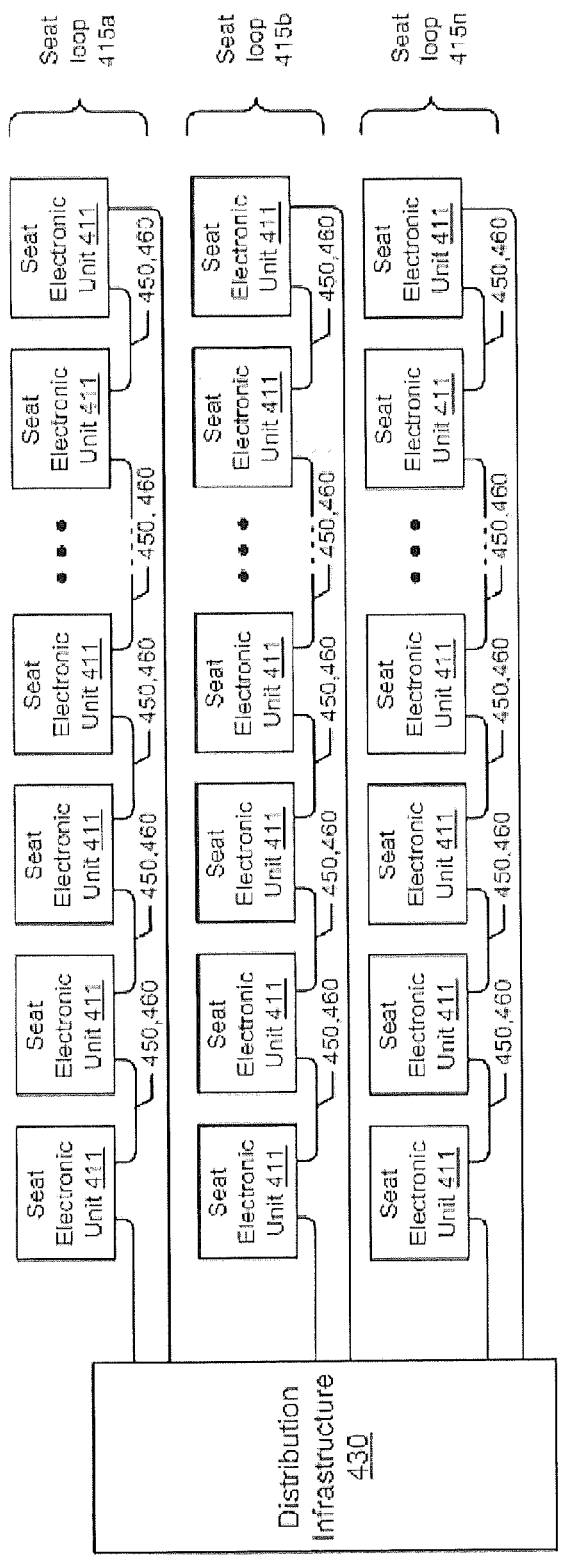
FIG. 4 is a block diagram of daisy chained packet data network (PDN) loops of seat electronic units connected to a content server according to some embodiments of the present inventive concept.

Referring now to FIG. 4, a block diagram illustrating daisy chained packet data network (PDN) loops (forming the seat loops 415a, 415b . . . 415n) of seat electronic units 411 that are connected to the content server 300 (e.g., via the distribution infrastructure 430) will be discussed. As illustrated in FIG. 4, each of the seat loops 415a, 415b, 415n includes a plurality of seat electronic units 411 that are daisy chained together by a combination of wired PDN loop segments 450 which communicate data packets containing content, and separate dedicated power line segments 460 which supply power to the seat electronic units 411. In some embodiments, the PDN loop segments 450 are Ethernet connections having Ethernet compatible wiring to transport data packets, according to, for example, Ethernet 100 Base T or other networking communication standards such as 10 Base 2, 10 Base 5, 1000 Base T, 1000 Base X, Gigabit, or may be other types of data networks such as Asynchronous Transfer Mode (ATM).

The seat electronic units 411 are therefore connected to communicate data via PDN loop segments 450 with immediately adjacent seat electronic units 411 in the seat loop, or with the content server 300 when a seat electronic unit 411 is located on one end of the seat loop. The seat electronic units 411 are powered by the power line segments 460.

In some embodiments, each of seat loops 415a, 415b . . . 415n communicates data packets containing content from the content server 300 and/or peer device in both directions through each of the seat electronic units 411, both upstream and downstream, until the data packet reaches one of the seat electronic units 411 that is addressed by the data packet (i.e., is the intended recipient unit for the data packet). Power may be provided in a daisy chained manner passing through each seat electronic unit 311 via the power line segments 460 in the same loop. Each of the seat loops 415a, 415b, 415n can include a large number of seat electronic units 411, with a corresponding large number PDN loop segments 450 and associated power line segments 460 interconnecting the seat electronic units 411 into the daisy chained loops. Thus, some embodiments of the present inventive concept allow peer to peer communication of data packets, i.e., the network loop is bidirectional allowing adjacent seat electronic units 411 to communicate with one another.

Figure 5:
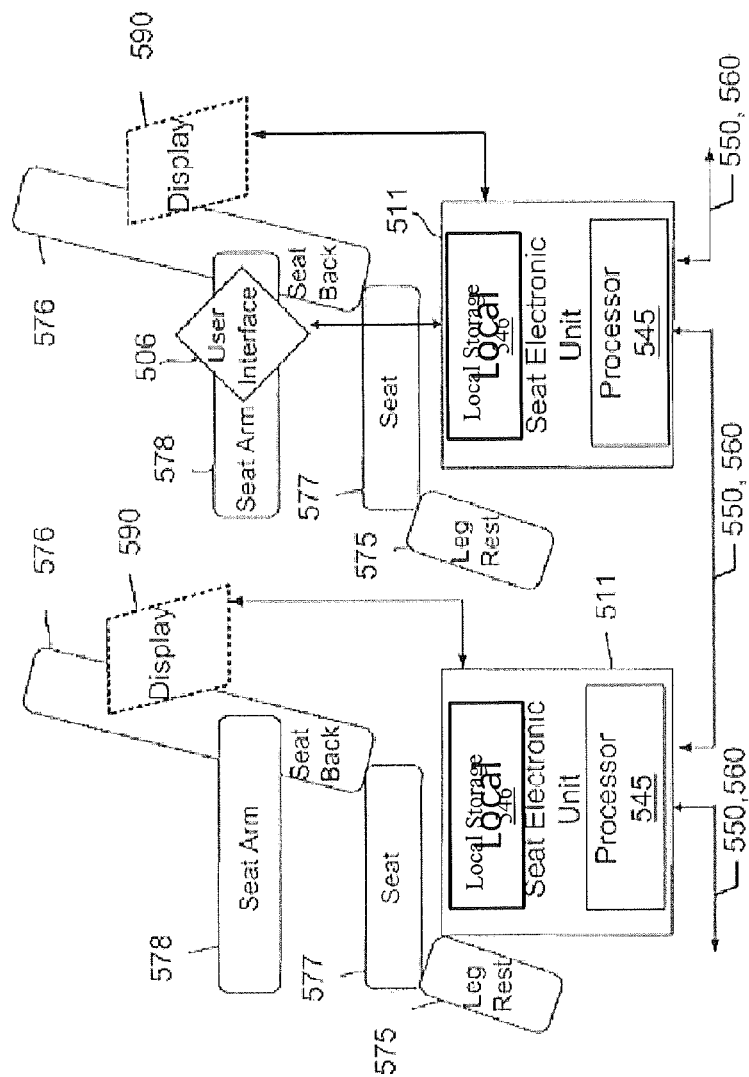
FIG. 5 is a block diagram illustrating example passenger seat configurations in accordance with some embodiments of the present inventive concept.
Figure 6:
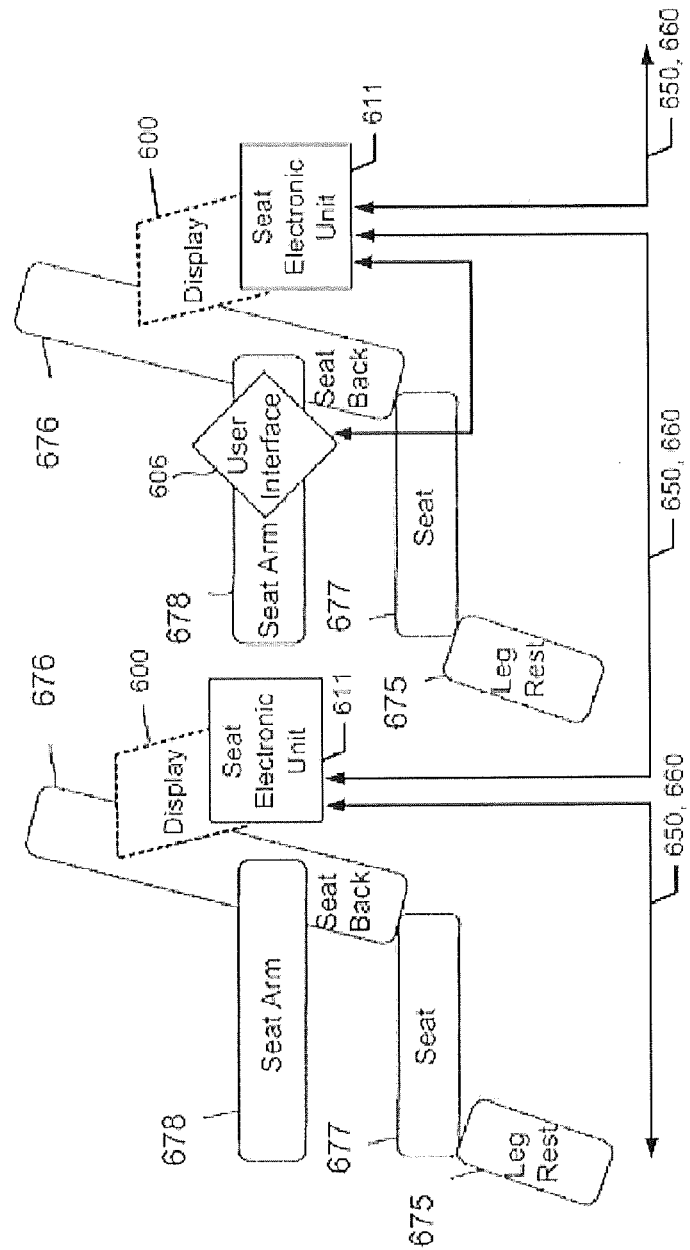
FIG. 6 is a block diagram illustrating example passenger seat configurations in accordance with some embodiments of the present inventive concept.

FIG. 5 illustrates an example passenger seat configuration that includes seat electronic units 511, which operate to route content to video display units 590 to provide in-flight entertainment (IFE) system functionality. FIG. 6 illustrates another example passenger seat configuration that includes seat electronic units 611, which may be co-located with a video display unit 690 or may be proximately located to the video display unit (e.g., attached to the seat back 676, to the seat arm 678 of the passenger seat, or attached elsewhere), and which operate to route content to video display units 690 to provide in-flight entertainment (IFE) system functionality. The seat electronic units 511, 611 may be located elsewhere relative to a seat or a group of seats and need not be located as shown in FIGS. 5 and 6. For example, the seat electronic units 511, 611 may be incorporated into the video display units to form a contiguous unit.

As illustrated in FIGS. 5 and 6, the example seat configuration includes a seat 577, 677, with a seat back 576, 676, a seat arm 578, 678, and a leg rest 575, 675. A user interface 506, 606, which may be connected to the seat arm 578, 678 or may be adjacent to or part of the video display unit 590, 690 (e.g., a touch sensitive display interface). The user interface 506, 606 is connected to a processor 545, 645 within a seat electronic unit 511, 611. As further illustrated in FIG. 5, but is also present and not illustrated in FIG. 6, the seat electronic unit 511 includes local storage 546 for storing data content locally as discussed in accordance with some embodiments of the present inventive concept.

The processor 545, 645 within the seat electronic unit 511, 611 may be configured to request content from the content server 300 and/or local storage 546 responsive to a user signaled request from the user interface 506, 606, configured to extract and process content received in data packets from the content server 300/local storage 546, and configured to output video content to the connected video display unit 590, 690 (which may be attached to a seat back 576, 676 facing the passenger seat, attached the seat arm 578, 678 of the passenger seat, or attached elsewhere) and output audio content to a headset jack through one or more communication interfaces. The processor 545, 645 may provide content to more than one video display unit 590, 690, such as to the video display units 590, 690 for a group of adjacent seats along a row.

It will be understood that although the system discussed above with respect to FIGS. 3 through 6 includes various components, embodiments of the present inventive concept are not limited to this configuration. For example, other configurations of seat electronic units may be used without departing from the scope of the present inventive concept.

Referring again to FIG. 3, functionality of the content distribution module 380 will now be discussed. As used herein, the system's "data-path capacity" refers to a maximum input/output throughput, which is a function of its hardware (HW) architecture including, for example, central processing unit (CPU) memory, non-volatile storage, interconnects, and the like. Furthermore, it will be understood in accordance with some embodiments of the present inventive concept multiple loops are often joined such that they can be concatenated (at layer 2) to form one large ring network, consisting of all clients in the system, for example, an IFE system. An embedded IFE client's design is amenable to consume and supply content concurrently because the two tasks exercise sub-components with minimal conflicts.

As will be discussed further below, in accordance with some embodiments discussed herein, if a passenger's requested content is not available locally, then it can be retrieved from a nearby client using a variety of protocols, for example, Service Location Protocol (SLP), statically configured according to shortest distance, and the like. In accordance with some embodiments, content should be distributed to minimize a) storage cost (by minimizing duplication) and b) data path opportunity cost (by maximizing streaming utilization). Each content type i imposes a load on the system as a function of its popularity $P_i$, file size $S_i$, and stream rate $R_i$. At each node, there's a trade-off between data-path and storage capacities. When data-path capacity is high, content may be sparsely populated and each node can serve many neighboring nodes. Inversely, when data-path capacity is low, then content needs to be replicated at higher frequency across the network as will be discussed further below with respect to FIGS. 7-11.

Figure 7:
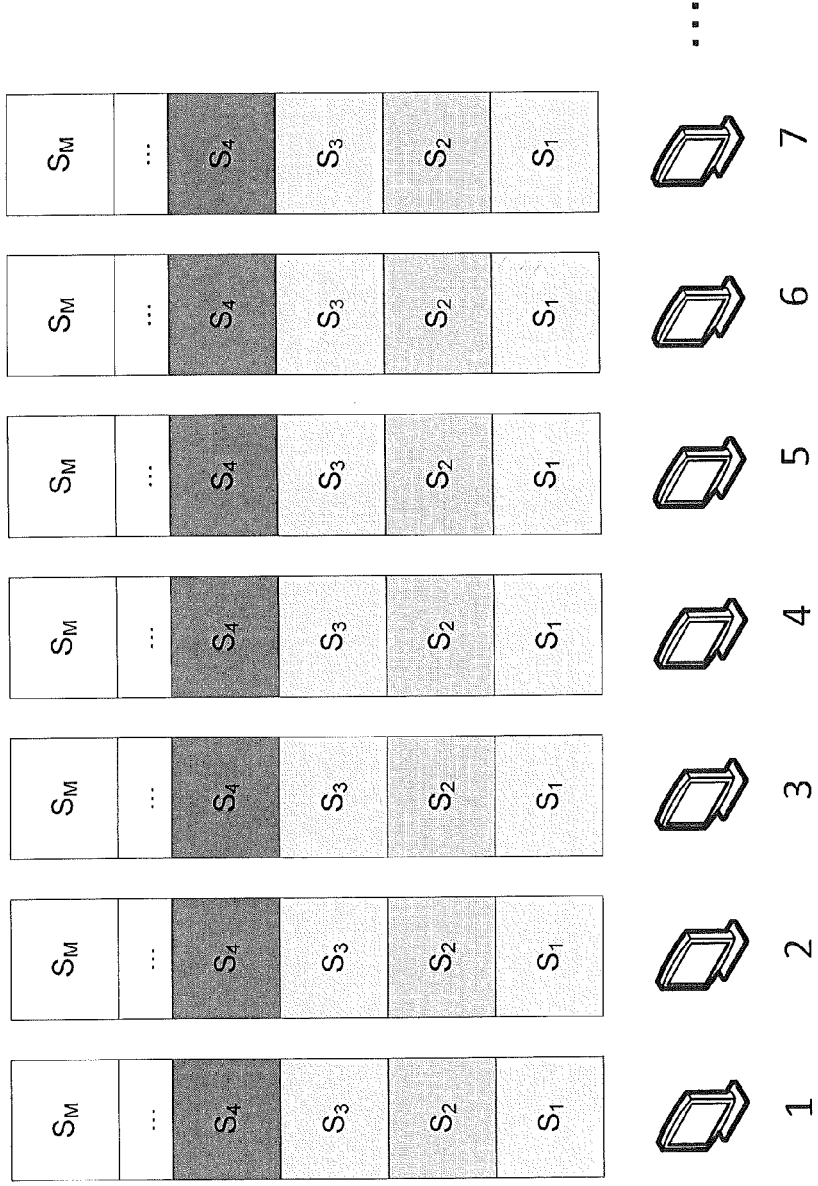
FIG. 7 is a block diagram illustrating embodiments storing all content at the local devices.

Various examples will be discussed with respect to FIGS. 7-11 to explain various embodiments of the present inventive concept. Referring first to FIG. 7, assume the following system parameters: the number of clients N in the ring network is large; a set of M content files $\{F_1, \ldots, F_M\}$ with identical stream rates $R_i$=R, popularity $P_i$=1, and file size $S_i$=S, for $1 \leq i \leq M$. This is an over-provisioned system, i.e., each client 1-7 stores every media file $\{F_1, \ldots, F_M\}$ locally in local storage (546). $P_i$=1, for all i, implies the system will have capacity to stream every single content file to every client concurrently. Thus, each client has the capacity to stream to 2MR, i.e., each client's streaming capacity is sufficient to serve two clients, itself and one other client. An obvious solution is to store all content locally, requiring $\Sigma_i S_i$=MS storage capacity at each node as illustrated in FIG. 7.

Figure 8:
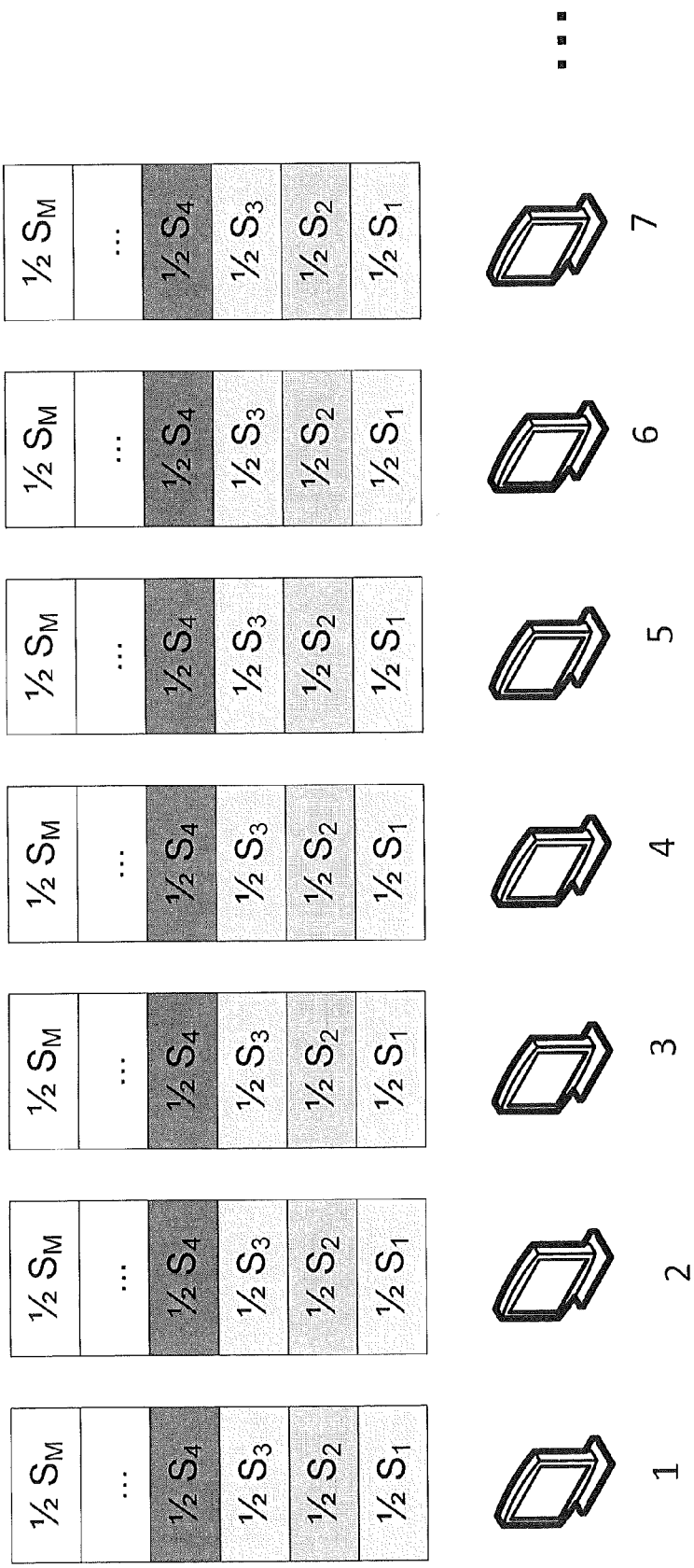
FIG. 8 is a block diagram illustrating a theoretical distribution of a same content to multiple local devices in accordance with some embodiments of the present inventive concept.

Referring now to FIG. 8, another solution is to store the first half of each content file $\{F_1, \ldots, F_M\}$ at each odd node (1, 3, 5, 7 . . . ), and the second half of each content file $\{F_1, \ldots, F_M\}$ at each even node (2, 4, 6 . . . ). This solution meets the system's streaming requirements, with storage requirement ½MS, i.e., half of the original's. As discussed above, embodiments of the present inventive concept assume that media and data are stored atomically, i.e., no fractional file storage is allowed and, thus, a media (or data) file is either stored in its entirety on the client or not at all.

Figure 9:
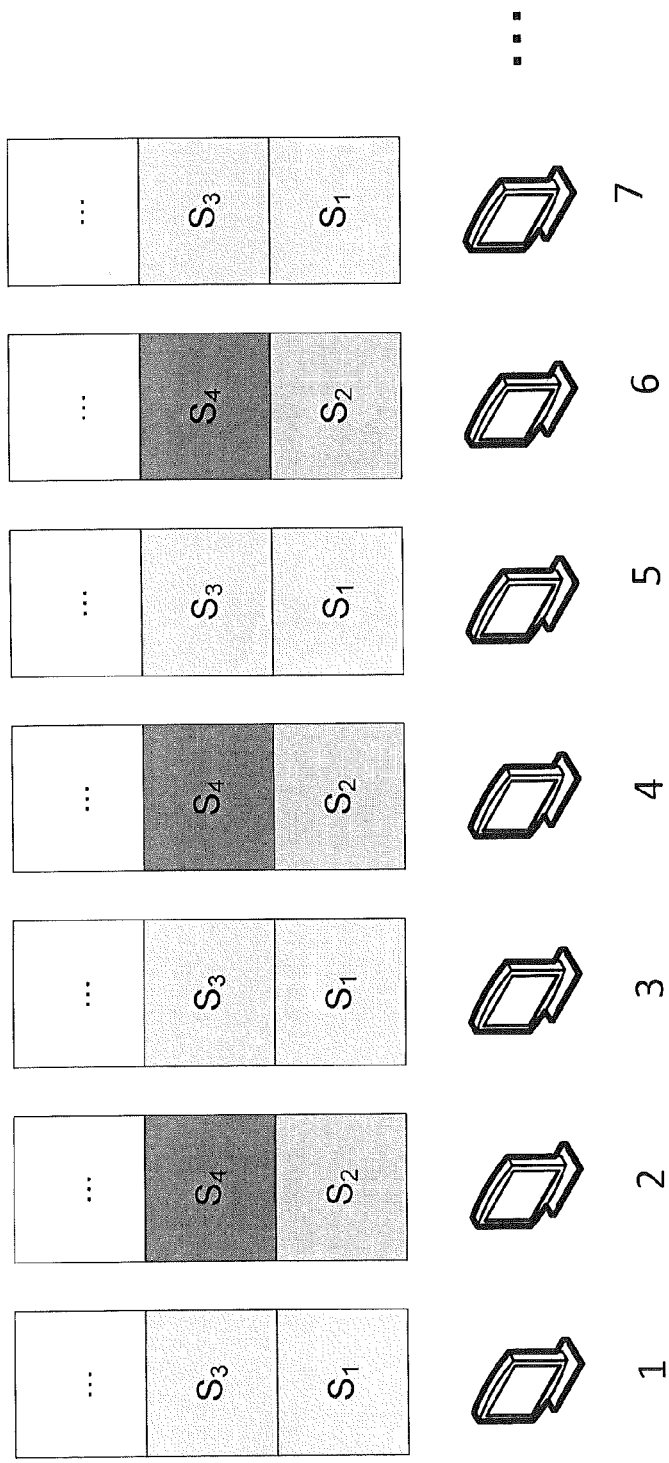
FIG. 9 is a block diagram illustrating distribution of content in accordance with some embodiments of the present inventive concept.

Accordingly, this atomicity condition may be enforced by combining the fractional files intelligently as illustrated in FIG. 9. The local storage requirement of the system illustrated in FIG. 9 is approximately ½(M+1)S. As illustrated therein, each file $F_1$, $F_2$, $F_3$ and $F_4$ are stored in full at the client, but not every content file is stored on every client. Thus, for example, if a user of a client that only contains content $F_2$ and $F_4$ (nodes 2, 4, 6) requests to view/listen to content file $F_1$ or $F_3$, the content file can be obtained from another client storing the requested media, $F_1$ or $F_3$ (nodes 1, 3, 5, 7), i.e., the content file can be obtained from a peer device without having to request the content file from the central server. Thus, reducing the overall storage required in the system and decreasing the amount of overall traffic in the loop, especially the hot spots.

Figure 10:
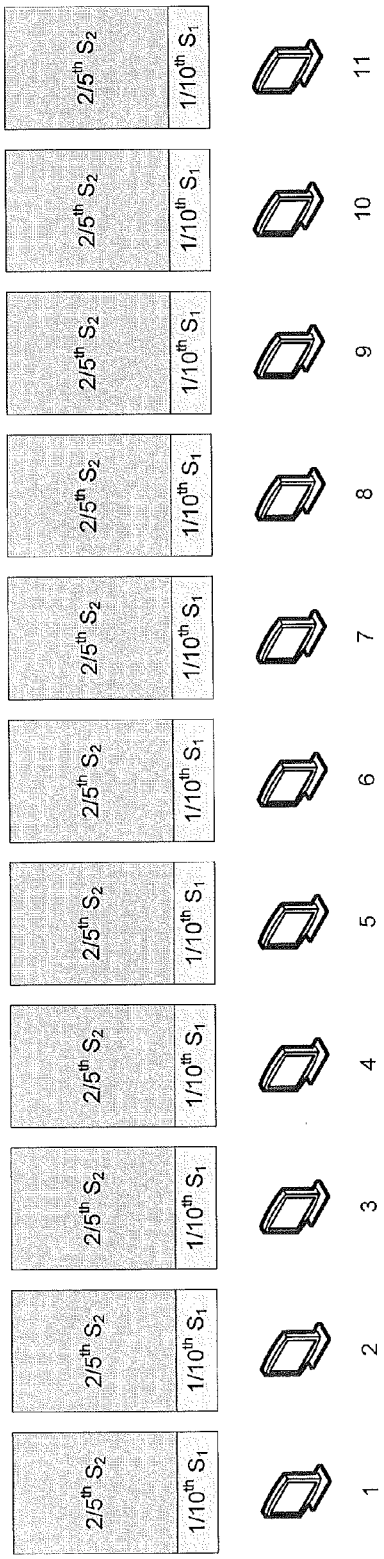
FIG. 10 is a block diagram illustrating a theoretical distribution of a same content to multiple local devices in accordance with some embodiments of the present inventive concept.

Examples and embodiments discussed above with respect to FIGS. 7-9 assume identical stream rates, file sizes and popularity. Referring now to FIG. 10, embodiments of the present inventive concept will be adapted for non-ideal (real) conditions where, for example, the stream rates of different content types are not necessarily the same, the file sized of the different content files are not necessarily the same and/or the popularity of the different content files are not necessarily the same. For example, movies may be streamed at a different stream rate than music.

Referring now to FIG. 10, assume the following system parameters: a large number of clients; a set of two content files with stream rates $R_2$=$4R_1$, popularity $P_i$=1, and file size $S_1$=$S_2$; and each client has stream capacity $10R_1$. As illustrated in FIG. 10, the basic solution requires $S_1$ storage capacity at each node. As illustrated therein, store the first tenth of a content file $F_1$ at client 1, the second tenth at client 2, . . . , $1^{st}$ first tenth at client 11, . . . . In the next step, divide file $F_2$ up into five equal fractions and store fractions 1 & 2 at client 1, fractions 3 & 4 at client 2, fractions 5 & 1 at client 3, fractions 2 & 3 at client 4, and the like.

Figure 11:
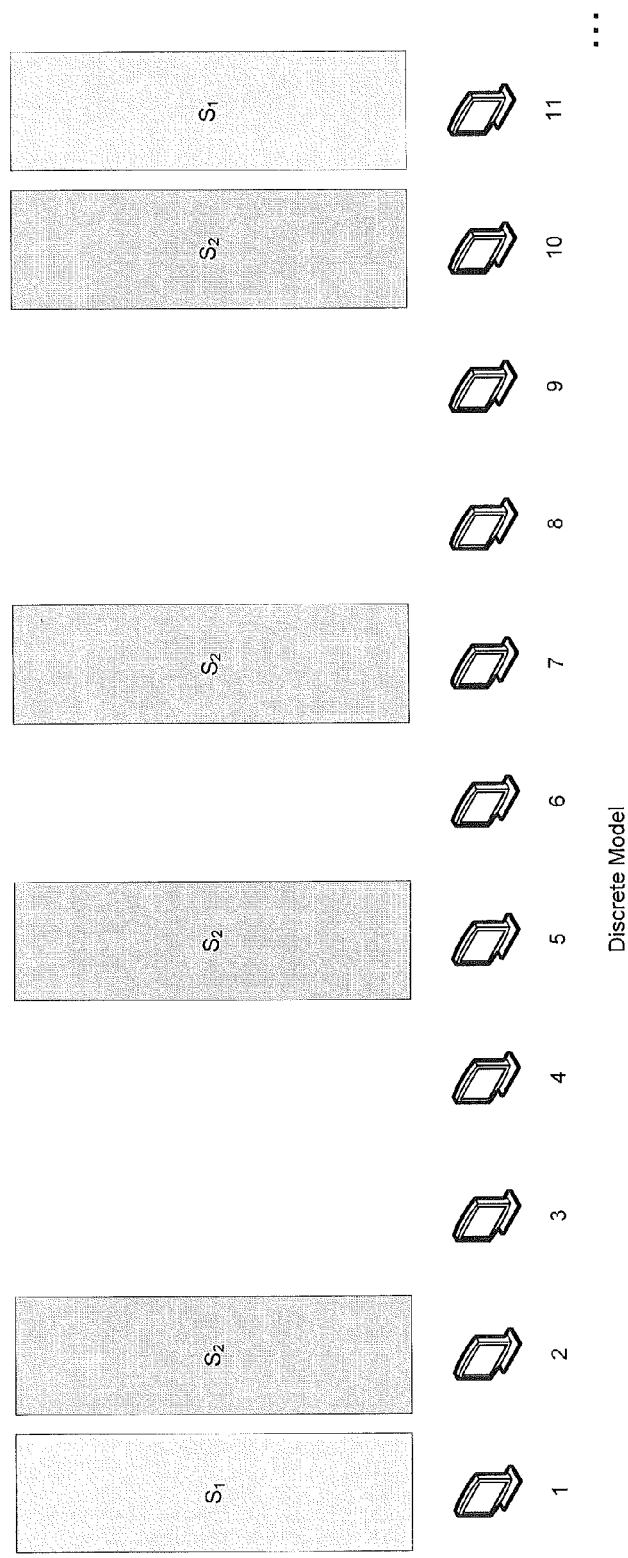
FIG. 11 is a block diagram illustrating distribution of content in accordance with some embodiments of the present inventive concept.

To enforce the atomicity requirement, $S(=S_1=S_2)$ storage is required at each node as illustrated in FIG. 11. Spacing between clients is not perfectly distributed, $F_1$ (for example, a song) and $F_2$ (for example, a movie) should be spaced out on different clients as much as possible. The content distribution module 380 is configured to determine which content files to store in which nodes based on the stream rates, popularity, file size and the like and a specified quality of service.

Consider the worst-case load with N passengers (at N clients). Given a set of contents $\{F_1, \ldots, F_M\}$ with streaming rates $R_i$, $i \in [1, M]$, each passenger introduces an expected streaming requirement $E[R]=\Sigma_i P_i R_i$ on the system. It will be understood that when $\Sigma_i P_i$=1, then E[R] can be considered to be the traditional expected value (from probability theory) of the random variable R. In other words, when $P_i$=1, all contents is guaranteed to be available to everyone at any time, worst case scenario. However, the content distribution module 380 in accordance with some embodiments does not require this equality. Practically, $P_i$ may be any real value in the interval [0, 1], and $1 \leq \Sigma_i P_i \leq M$. For a large system, which may include numerous passengers and a large content set, $\{P_i, i \in [1, M]\}$ may be chosen such that $\Sigma_i P_i \rightarrow 1$, exploiting the statistical multiplexing principle to size a system for a particular service blocking probability. A system which guarantees 100% service availability (of all content to all passengers simultaneously, for example, picture-in-picture, multi-view and the like, has $P_i$=1 for all $i \in [1, M]$.

As discussed above, FIGS. 8 and 10 illustrate a fluid model, which is not atomic, i.e. content of a single type (movie, song) is stored on different clients. In other words, a single movie may be stored in fragments on two or more clients. However, as discussed above, embodiments of the present invention use a discrete model where content is stored atomically, which requires all of a particular content file to be stored on the same client. Content distribution modules 380 in accordance with some embodiments of the present inventive concept are configured to use the analogous fluid model (storing content in portions on different clients) to derive an optimal solution. Then, this optimal solution (derived using the fluid model) may be used to derive/guide the solution to the discrete (real) problem, i.e. where fractional content storage is prohibited.

In particular, the solution to the fluid model is trivial, yielding a symmetric system where each client stores a fraction of each content file. This fluid model solution can be applied to the discrete model by coalescing the fractional content files into complete files and storing them at appropriate spacing. In other words, the output of the content distribution module 380 indicates where (in a discrete system) to store the content files, i.e. how far apart the content files can be stored in the system, how many clients away. Thus, the content distribution module is configured to distribute the content throughout the network with two objectives: even spacing between copies of the same content; and to never over commit a node's stream capacity.

An example of the functions performed by a content distribution module 380 in accordance with some embodiments of the present inventive concept will now be discussed. A client with data-path capacity D could serve $\alpha(=D/E[R])$ clients, on average, using its local content. If a client's data-path capacity D can serve only one player, for example, itself, no reduction in the local storage is possible. And each client's storage requirement is $S_{tot}=\Sigma_i S_i$. If a client can serve $\alpha$ clients, including itself, each client's storage requirement is now $S_{tot}/\alpha$, in the fluid model. $\alpha$ is the opportunity factor. For a given system, when $\Sigma_i P_i \rightarrow 1$, $\alpha$ increases and the system has more potential storage "gain," less storage is required at each client. On the other hand, when $\Sigma_i P_i \rightarrow M$, the system provides robustness and quality of experience at the expense of increased storage requirement at each client.

As the system size increases, with numerous passengers and large content set, the difference in efficiency between fluid and discrete solutions becomes smaller. Accordingly, some embodiments of the present inventive concept provide advantages over conventional solutions in at least two ways: embodiments of the present inventive concept do not require a dedicated server to stream content (although it may have one); and embodiments of the present inventive concept exploit the inherent spare data-path capacity to reduce the amount of storage required at each client. Furthermore, since content data is highly distributed, systems in accordance with embodiments discussed herein are fault-tolerant and may not be susceptible to instabilities associated with hot-spots.

Particular embodiments of the content distribution module 380 will now be discussed. From the all-clients ring, the clients are indexed from 0 to N−1. The storage frequency of a particular content $F_i$, i.e., how the particular content is stored at a client, is a function of its popularity $P_i$ and the system-wide opportunity factor $\alpha$, discussed above. In particular, the content distribution module 380 is configured as follows:

each client j is indexed from 0 to N−1;
each client j has four associated parameters: (1) data-path capacity D; (2) data-path occupancy $R_{occ}(j)$; (3) storage capacity S; and (4) storage occupancy $S_{occ}(j)$;
assume D and S are identical for all clients;
content files are distributed one at a time;
the order in which the content files are distributed is arbitrary;
for each content $F_i$, from client j=0 to N−1, $jP_i R_i$ for each client j is calculated;
at each client j, if $\lfloor (j-1)P_i R_i/\xi \rfloor < \lfloor jP_i R_i/\xi \rfloor$, then store $F_i$ at client j if it has spare storage capacity ($S_{occ}(j) \le S$) and spare data-path capacity ($R_{occ}(j) \le D$);
If not, check clients j+1 mod N, j+2 mod N, etc. until the first one with both conditions satisfied is found, for example, node m;
$\lfloor x \rfloor$ denotes the floor function of x, and is the whole number part of x;
It will be understood that the parameter $\xi$ is used to control distribution periodicity. $\xi$ can range from E[R] to D. With $\xi$=E[R], the average distance between copies of a particular content i is small, implying greater redundancy and robustness. At $\xi$=D, the distance between them is greater, implying minimum storage resource utilization;
Store a copy of $F_i$ at client m if it doesn't already have a copy;
Update $R_{occ}(m) = R_{occ}(m) + \xi$;
Update $S_{occ}(m) = S_{occ}(m) + S_i$ if client in doesn't already have a copy of $F_i$;
If client m already has a copy of $F_i$, do not update $S_{occ}(m)$;
at node m=N−1, allocate the remainder server load (fractional_part((N−1) $P_i R_i$) $\xi$) to the next node j (mod N) with sufficient spare stream ($R_{occ}(j) \le D$) and storage ($S_{occ}(j) \le S$) capacities.

Property 1: Bounded storage. If D=$\alpha$E[R] and S>($\alpha$+1) Max$\{S_i, i \in [1, M]\}$, $\alpha$>1, then there exists at least one client m where $R_{occ}(m) \le D$ and $S_{occ}(m) \le S$, at the conclusion of the algorithm.

Proof: each time a file $F_i$ is stored at a client m, D is added to its rate occupancy $R_{occ}(m)$ to implicitly reserve its data-path capacity.

For example, suppose none of the clients meet the conditions $R_{occ}(.) \le D$ and $S_{occ}(.) \le S$. This means that every client j is in one of the following three states:

1. $R_{occ}(j) > D$ and $S_{occ}(j) \le S$
2. $R_{occ}(j) \le D$ and $S_{occ}(j) > S$
3. $R_{occ}(j) > D$ and $S_{occ}(j) > S$ State number 2 is impossible. If $R_{occ}(j) \le D$, then the number of files stored at node j must be less than or equal to D/$\xi \le$D/E[R]=$\alpha$. The storage occupancy $S_{occ}(.)$ at j must be less than or equal to $\alpha$Max$\{S_i, i \in [1, M]\}$, contradicting the second part (i.e., $S_{occ}(j) > S$).

In the remaining conditions, $R_{occ}(j) > D$ for every client. This implies that the aggregated data-path demand is greater than ND=N$\alpha$E[R]—an impossibility. Q.E.D.

Property 1 establishes the required resources at each client to meet the system's performance objectives.

Property 2: Sufficient server coverage. Under the content distribution described above, if $\alpha$>1, the system has sufficient aggregate server capacity N $P_i R_i$ to serve content $F_i$, $i \in [1, M]$.

Proof: by application of Property 1.

Property 3: Predictable distance between clients and content. The average number of hops between any client and content file $F_k$ is less than $\xi/2P_k R_k$.

The algorithm deposits between $NP_k R_k/\xi$ and $(NP_k R_k/\xi)+1$ copies of $F_k$ in the ring. Therefore, the average distance between copies of $F_k$ is less than $N/(NP_k R_k/\xi) = \xi/P_k R_k$. For an arbitrary client, the average distance to $F_k$ is half of that and is less than $\xi/2P_k R_k$.

As discussed above, some embodiments of the present inventive concept use a fluid module to determine a distribution plan and then apply the determined distribution plan to a discrete model to reduce the storage needed in the IFE system and increase a quality of service experienced by a user thereof.

As further discussed above, systems in accordance with embodiments discussed herein can be customized. In other words, a desired quality of service may be selected and the system can be designed to meet the specified quality of service. In some embodiments, the starting node may be desynchronized for each content i (by varying the initial node off-set), which will lead to the same over-all performance characteristics. In some embodiments, the smoothness index $\xi$ may be varied to select a desired balance between redundancy and robustness vs. storage efficiency. In some embodiments, the popularity indices $P_i$ may be adjusted to select the desired balance between deterministic v.s. probabilistic QoS.

For the purposes of promoting an understanding of the principles of the inventive concept, reference has been made to the embodiments illustrated in the drawings, and specific language has been used to describe these embodiments. However, no limitation of the scope of the inventive concept is intended by this specific language, and the inventive concept should be construed to encompass all embodiments that would normally occur to one of ordinary skill in the art. The terminology used herein is for the purpose of describing the particular embodiments and is not intended to be limiting of exemplary embodiments of the inventive concept.

Numerous modifications and adaptations will be readily apparent to those of ordinary skill in this art without departing from the spirit and scope of the inventive concept as defined by the following claims. Therefore, the scope of the inventive concept is defined not by the detailed description of the inventive concept but by the following claims, and all differences within the scope will be construed as being included in the inventive concept.

For the sake of brevity, conventional electronics, systems, and software functional aspects of the systems (and components of the individual operating components of the systems) may not be described in detail. Furthermore, the connecting lines, or connectors shown in the various figures presented are intended to represent example communication/functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

The use of any and all examples, or exemplary language (e.g., "such as") provided herein, is intended merely to better illuminate the inventive concept and does not pose a limitation on the scope of the inventive concept unless otherwise claimed. The use of the terms "a" and "an" and "the" and similar referents in the context of describing the inventive concept (especially in the context of the following claims) are to be construed to cover both the singular and the plural, unless the context unambiguously indicates otherwise. In addition, it should be understood that although the terms "first," "second," etc. may be used herein to describe various elements, these elements should not be limited by these terms, which are only used to distinguish one element from another. The term "and/or", abbreviated "/", includes any and all combinations of one or more of the associated listed items.

When a node is referred to as being "connected", "coupled", "responsive", or variants thereof to another node, it can be directly connected, coupled, or responsive to the other node or intervening nodes may be present. In contrast, when an node is referred to as being "directly connected", "directly coupled", "directly responsive", or variants thereof to another node, there are no intervening nodes present. Like numbers refer to like nodes throughout.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable media that can direct a computer or other programmable data processing apparatus to function in a particular manner, such that the instructions stored in the computer-readable media produce an article of manufacture including instructions which implement the functions/acts specified in the block diagrams and/or flowchart block or blocks.

A tangible, non-transitory computer-readable media may include an electronic, magnetic, optical, electromagnetic, or semiconductor data storage system, apparatus, or device. More specific examples of the computer-readable media would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing device to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present inventive concept may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

That which is claimed is:

1. A method for distributing content in an entertainment system, the entertainment system including a plurality of clients connected in a bi-directional loop configuration and each of the plurality of clients having at least one associated video display unit, the method comprising:
   deriving a content distribution plan for distributing content files to the plurality of clients based on a theoretical symmetric system where each of the plurality of clients in the symmetric system is configured to store at least a fraction of each of the content files; and
   applying the derived content distribution plan for distributing content files to an actual entertainment system wherein each of the content files are stored in full in at least one of the plurality of clients of the system to provide an actual content distribution plan for the actual entertainment system.

2. The method of claim 1, further comprising storing copies of a same content file at at least two of the plurality of clients, wherein the at least two plurality of clients are configured to playback the stored content file on the video display unit physically therewith and/or stream the stored content file to a video display unit physically with another of the plurality of clients.

3. The method of claim 2, further comprising distributing the content files according to the actual content distribution plan for the actual entertainment system.

4. The method of claim 3, wherein distributing the content files according to the actual content distribution plan for the actual entertainment system comprises:
   attempting to minimize duplication of each of the content files by storing the same content file in as few of the plurality of clients as possible while satisfying a specified quality of service; and
   attempting to maximize use of an existing data path by retrieving content files from adjacent clients rather than retrieving the content files from a central server.

5. The method of claim 3, wherein distributing the content files according to the actual content distribution plan for the actual entertainment system is followed by:
   receiving real time feedback with respect to performance of the actual content distribution plan for the actual entertainment system;
   adjusting the actual content distribution plan based on the received real time feedback to provide an adjusted content distribution plan; and
   distributing the content files based on the adjusted content distribution plan.

6. The method of claim 1, wherein each of the content files $F_i$ has an associated content type and wherein each content type has an associated load, the associated load being a function of popularity of the content type ($P_i$), a file size of the content type ($S_i$) and the stream rate of the content type ($R_i$).

7. The method of claim 1, wherein the entertainment system comprises an in flight entertainment system.

8. The method of claim 1, wherein each of the plurality of clients has an associated data path capacity (D), an associated data-path occupancy $R_{occ}(.)$, an associated storage capacity (S) and an associated storage occupancy $S_{occ}(.)$.

9. An entertainment system comprising:
   a central server;
   a plurality of clients in communication with the central server, the plurality of clients being connected in a bi-directional loop configuration; and
   at least one video display unit physically with each of the plurality of clients,
   wherein at least two of the plurality of clients are configured to store a same content file and wherein the at least two plurality of clients are configured to playback the stored content file on the video display unit physically therewith and/or stream the stored content file to a video display unit physically with another of the plurality of clients connected in the bidirectional loop.

10. The entertainment system of claim 9, further comprising a content distribution module, the content distribution module configured to:
    derive a content distribution plan for distributing content files to the plurality of clients based on a theoretical symmetric system where each of the plurality of clients in the symmetric system is configured to store at least a fraction of each of the content files; and
    apply the derived content distribution plan for distributing content files to an actual entertainment system wherein each of the content files are stored in full in at least one of the plurality of clients of the system to provide an actual content distribution plan for the actual entertainment system.

11. The entertainment system of claim 10, wherein the content distribution module is further configured to distribute the content files according to the actual content distribution plan for the actual entertainment system.

12. The entertainment system of claim 11, wherein the content distribution module is further configured to:
    attempt to minimize duplication of each of the content files by storing the same content file in as few of the plurality of clients as possible while satisfying a specified quality of service; and
    attempt to maximize use of an existing data path by retrieving content files from adjacent clients rather than retrieving the content files from a central server.

13. The entertainment system of claim 11, wherein the content distribution module is further configured to:
receive real time feedback with respect to performance of the actual content distribution plan for the actual entertainment system;
adjust the actual content distribution plan based on the received real time feedback to provide an adjusted content distribution plan; and
distribute the content files based on the adjusted content distribution plan.

14. The entertainment system of claim 10, wherein each of the content files has an associated content type and wherein each content type has an associated load, the associated load being a function of popularity of the content type ($P_i$), a file size of the content type ($S_i$) and the stream rate of the content type ($R_i$).

15. The entertainment system of claim 9, wherein the entertainment system comprises an in flight entertainment system.

16. A computer program product for distributing content in an entertainment system, the entertainment system including a plurality of clients connected in a bi-directional loop configuration and each of the plurality of clients having at least one associated video display unit, the computer program product comprising:
a non-transitory, computer readable storage medium having computer readable program code embodied in the medium, the computer readable program code comprising:
computer readable program code configured to derive a content distribution plan for distributing content files to the plurality of clients based on a theoretical symmetric system where each of the plurality of clients in the symmetric system is configured to store at least a fraction of each of the content files; and
computer readable program code configured to apply the derived content distribution plan for distributing content files to an actual entertainment system wherein each of the content files are stored in full in at least one of the plurality of clients of the system to provide an actual content distribution plan for the actual entertainment system.

17. The computer program product of claim 16, further comprising computer readable program code configured to store copies of a same content file at at least two of the plurality of clients, wherein the at least two plurality of clients are configured to playback the stored content file on the video display unit physically therewith and/or stream the stored content file to a video display unit physically with another of the plurality of clients.

18. The computer program product of claim 17, further comprising computer readable program code configured to distribute the content files according to the actual content distribution plan for the actual entertainment system.

19. The computer program product of claim 18, wherein the computer readable program code configured to distribute the content files according to the actual content distribution plan for the actual entertainment system comprises:
computer readable program code configured to minimize duplication of each of the content files by storing the same content file in as few of the plurality of clients as possible while satisfying a specified quality of service; and
computer readable program code configured to maximize use of an existing data path by retrieving content files from adjacent clients rather than retrieving the content files from a central server.

20. The computer program product of claim 18, further comprising:
computer readable program code configured to receive real time feedback with respect to performance of the actual content distribution plan for the actual entertainment system;
computer readable program code configured to adjust the actual content distribution plan based on the received real time feedback to provide an adjusted content distribution plan; and
computer readable program code configured to distribute the content files based on the adjusted content distribution plan.

21. The computer program product of claim 16, wherein each of the content files $F_i$ has an associated content type and wherein each content type has an associated load, the associated load being a function of popularity of the content type ($P_i$), a file size of the content type ($S_i$) and the stream rate of the content type ($R_i$).

22. The computer program product of claim 16, wherein the entertainment system comprises an in flight entertainment system.

23. The computer program product of claim 16, wherein each of the plurality of clients has an associated data path capacity (D), an associated data-path occupancy $R_{occ}(.)$, an associated storage capacity (S) and an associated storage occupancy $S_{occ}(.)$.

* * * * *